United States Patent
Chen et al.

(10) Patent No.: US 9,699,701 B2
(45) Date of Patent: Jul. 4, 2017

(54) MOBILITY OPERATION IN LTE

(71) Applicant: QUALCOMM Incorporated, San Diego, CA (US)

(72) Inventors: Wanshi Chen, San Diego, CA (US); Peter Gaal, San Diego, CA (US); Hao Xu, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 582 days.

(21) Appl. No.: 13/742,308

(22) Filed: Jan. 15, 2013

(65) Prior Publication Data
US 2014/0044097 A1 Feb. 13, 2014

Related U.S. Application Data

(60) Provisional application No. 61/682,125, filed on Aug. 10, 2012.

(51) Int. Cl.
*H04W 4/00* (2009.01)
*H04W 36/00* (2009.01)
(Continued)

(52) U.S. Cl.
CPC ........... *H04W 36/24* (2013.01); *H04W 36/06* (2013.01); *H04W 36/28* (2013.01)

(58) Field of Classification Search
CPC .................................................. H04W 36/06
(Continued)

(56) References Cited

U.S. PATENT DOCUMENTS 5,862,489 A * 1/1999 Aalto .................... H04W 52/50
370/331
6,201,795 B1 3/2001 Baum et al.
(Continued)

FOREIGN PATENT DOCUMENTS

| EP | 2237583 A1 | 10/2010 |
|----|------------|---------|
| EP | 2375809 A1 | 10/2011 |
| WO | 9319537 A1 | 9/1993 |

OTHER PUBLICATIONS

Catr: Uplink control signalling enhancement, 3GPP Draft; R1-123234, 3rd Generation Partnership Project (3GPP), Mobile Competence Centre ; 650, Route Des Lucioles ; F-06921 Sophia-Antipolis Cedex ; France vol. RAN WG1, no. Qingdao, China; 20120813-20120817 Aug. 5, 2012 (Aug. 5, 2012), XP050661125, Retrieved from the Internet: URL:http://www.3gpp.org/ftp/tsg_ran/WG1JL 1/TSGR1 70/Dots/.
(Continued)

*Primary Examiner* — Gerald Smarth
(74) *Attorney, Agent, or Firm* — Liem T. Do

(57) ABSTRACT

A method, an apparatus, and a computer program product for wireless communication are provided. In an aspect, the apparatus establishes a first and/or second communication link with at least a first cell. The first communication link may be for receiving transmissions and the second communication link may be for sending transmissions. The apparatus performs a handover of one of the first and second communication links to at least a second cell. The apparatus determines a value of a parameter after the handover is performed based on a value of the parameter prior to the handover. In another aspect, the apparatus establishes a first and/or second communication link with at least a first cell. The first communication link may be for receiving transmissions and the second communication link may be for
(Continued)

sending transmissions. In such aspect, a virtual cell ID is reconfigured for one of the first and second communication links.

47 Claims, 11 Drawing Sheets

(51) Int. Cl.
*H04W 36/24* (2009.01)
*H04W 36/06* (2009.01)
*H04W 36/28* (2009.01)

(58) Field of Classification Search
USPC .................................................. 370/328
See application file for complete search history.

(56) References Cited

U.S. PATENT DOCUMENTS

| | | | |
|---|---|---|---|
| 6,714,784 B1* | 3/2004 | Forssell | H04W 36/0005 370/331 |
| 8,855,044 B2* | 10/2014 | Liao | H04W 56/0045 370/324 |
| 2002/0032034 A1* | 3/2002 | Tiedemann, Jr. | H04W 36/0066 455/437 |
| 2003/0109257 A1 | 6/2003 | Nilsson et al. | |
| 2004/0120285 A1* | 6/2004 | Paila | H04W 72/005 370/331 |
| 2010/0234037 A1 | 9/2010 | Terry et al. | |
| 2010/0303011 A1* | 12/2010 | Pan et al. | 370/328 |
| 2011/0077038 A1 | 3/2011 | Montojo et al. | |
| 2011/0149913 A1 | 6/2011 | Park et al. | |
| 2011/0201334 A1* | 8/2011 | Rosenqvist | H04L 5/001 455/436 |
| 2012/0002643 A1 | 1/2012 | Chung et al. | |
| 2012/0113939 A1 | 5/2012 | Kim et al. | |
| 2012/0115423 A1* | 5/2012 | Sang et al. | 455/75 |
| 2012/0269113 A1* | 10/2012 | Park et al. | 370/315 |
| 2012/0294694 A1* | 11/2012 | Garot | F27D 1/141 411/427 |
| 2013/0010964 A1* | 1/2013 | Fong | H04L 5/0053 380/277 |
| 2013/0051240 A1* | 2/2013 | Bhattad et al. | 370/241 |
| 2013/0070726 A1* | 3/2013 | Zhang et al. | 370/331 |
| 2013/0163441 A1* | 6/2013 | Verma et al. | 370/248 |
| 2014/0038605 A1* | 2/2014 | Behnamfar | H04W 36/0061 455/436 |

OTHER PUBLICATIONS

International Search Report and Written Opinion—PCT/US2013/021767—ISA/EPO—Nov. 15, 2013.
Qualcom Incorporated: Downlink control signaling in support of downlink CoMP, GPP Draft; R1-123691 Downlink Control Signaling in Support of Downlink Comp, 3rd Generation Partnership Project (3GPP), Mobile Competence Centre ; 650, Route Des Lucioles ; F-06921 Sophia-Antipolis C vol. RAN WG1, no. Qingdao, China; 20120813-20120817 Aug. 5, 2012 (Aug. 5, 2012), XP050661565, Retrieved from the Internet: UPL:http://www.3gpp.org/ftp/tsg_ran/WG1_RL1/TSGR1 70/Docs/.
European Search Report—EP15180715—Search Authority—Munich—Dec. 2, 2015.
HTC, "Remaining issues of PUCCH enhancement for UL CoMP", 3GPP TSG RAN WG1 #70, 3GPP Draft; R1-123597, 3rd Generation Partnership Project (3GPP), Mobile Competence Centre ; 650, Route Deslucioles ; F-06921 Sophia-Antipolis Cedex, vol. RAN WG1, no. Qingdao, China; Aug. 13, 2012-Aug. 17, 2012, Aug. 5, 2012 (Aug. 5, 2012), XP050661474, 3 Pages. Retrieved from the Internet: URL: http://www.3gpp.org/ftp/tsg_ran/WG1_RL1/TSGR1_70/Docs/—[retrieved on Aug. 5, 2012].
Motorola Mobility, "Uplink Control Signaling for UL CoMP", 3GPP TSG RAN1#70, 3GPP Draft; R1-123793, 3rd Generation Partnership Project (3GPP), Mobile Competence Centre ; 650, Route Deslucioles ; F-06921 Sophia-Antipolis Cedex; France, vol. RAN WG1, no. Qingdao; Aug. 13, 2012-Aug. 17, 2012, Aug. 5, 2012 (Aug. 5, 2012), XP050661646, 4 Pages. Retrieved from the Internet: URL: http://www.3gpp.org/ftp/tsg_ran/WG1_RL1/TSGR1_70/Docs/—[retrieved on Aug. 5, 2012].
Partial International Search Report—PCT/US2013/021767—ISA/EPO—Sep. 11, 2013.

* cited by examiner

MOBILITY OPERATION IN LTE

CROSS-REFERENCE TO RELATED APPLICATION(S)

This application claims the benefit of U.S. Provisional Application Ser. No. 61/682,125, entitled "Improved Mobility Operation in LTE" and filed on Aug. 10, 2012, which is expressly incorporated by reference herein in its entirety.

BACKGROUND

Field

The present disclosure relates generally to communication systems, and more particularly, to improved mobility operation in LTE.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, a computer program product, and an apparatus are provided. The apparatus establishes a first and/or second communication link with at least a first cell. The first communication link may be for receiving transmissions and the second communication link may be for sending transmissions. The apparatus performs a handover of one of the first and second communication links to at least a second cell. The apparatus determines a value of a parameter after the handover is performed based on a value of the parameter prior to the handover.

In another aspect of the disclosure, the apparatus establishes a first and/or second communication link with at least a first cell. The first communication link may be for receiving transmissions and the second communication link may be for sending transmissions. In such aspect, a virtual cell ID is reconfigured for one of the first and second communication links.

DETAILED DESCRIPTION

Figure 1:
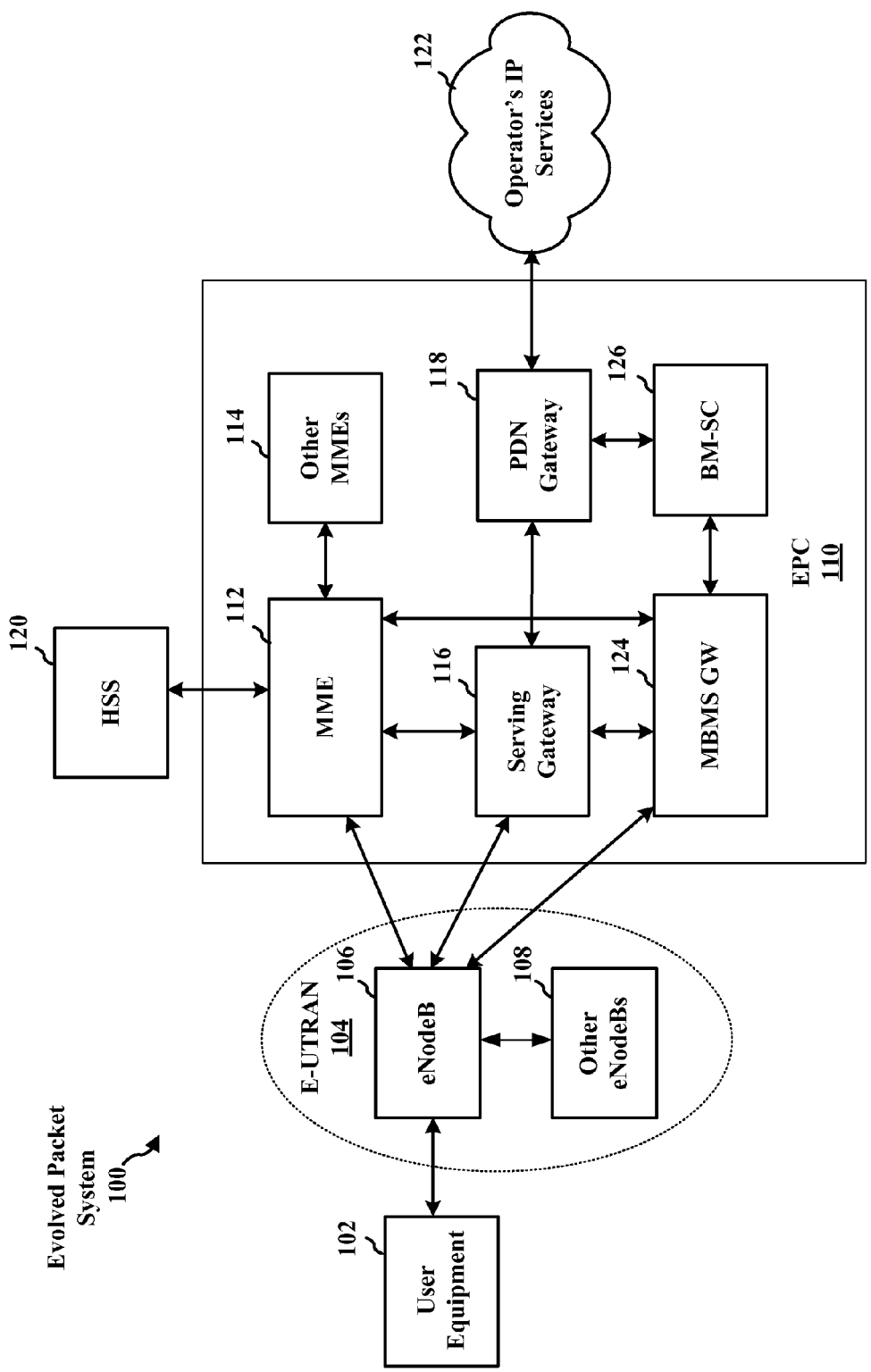
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control planes protocol terminations toward the UE 102. The eNB 106 may be connected to the other eNBs 108 via a backhaul (e.g., an X2 interface). The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 includes a Mobility Management Entity (MME) 112, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, an intranet, an IP Multimedia Subsystem (IMS), and a PS Streaming Service (PSS). The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the eNBs (e.g., 106, 108) belonging to an MBSFN area broadcasting a particular service, and may be responsible for session management (start/stop) and for collecting eMBMS related charging information.

Figure 2:
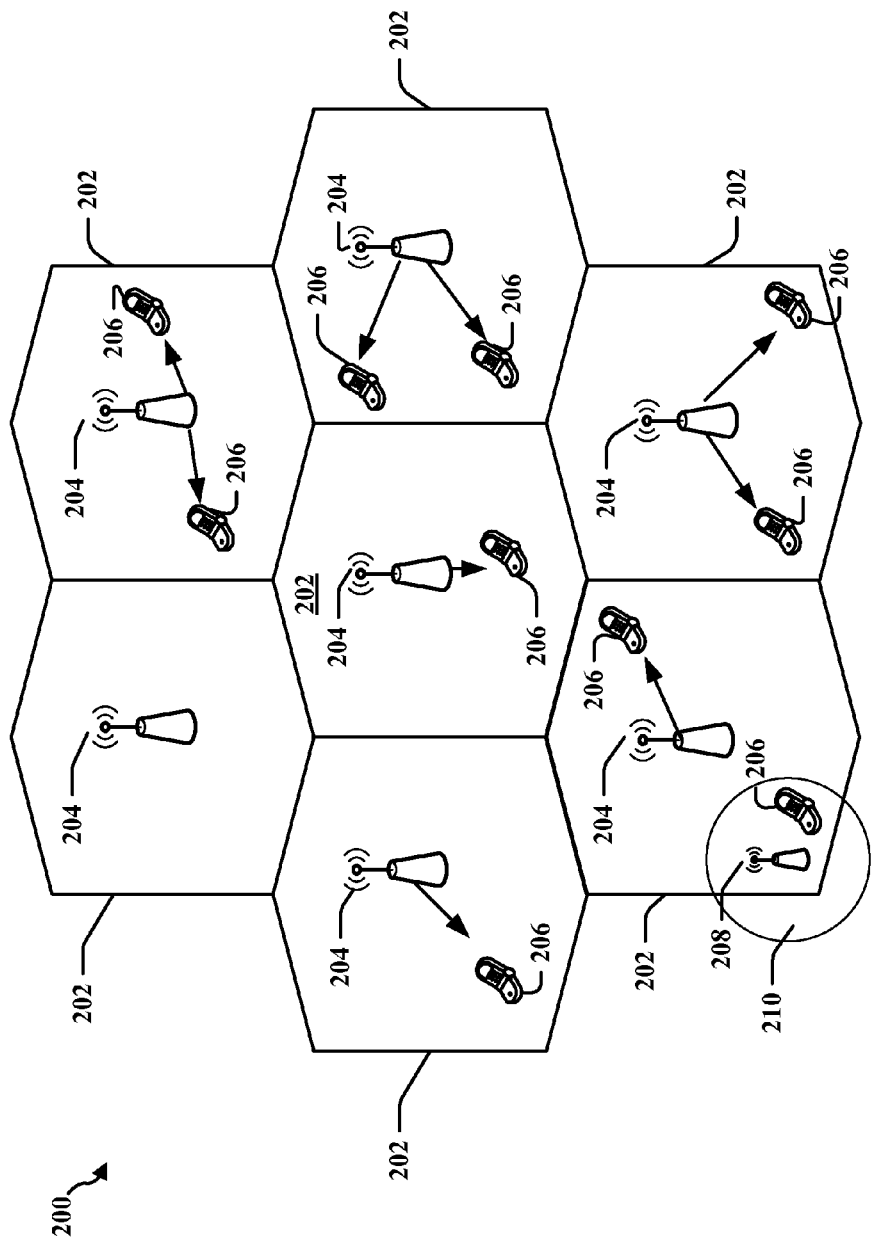
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
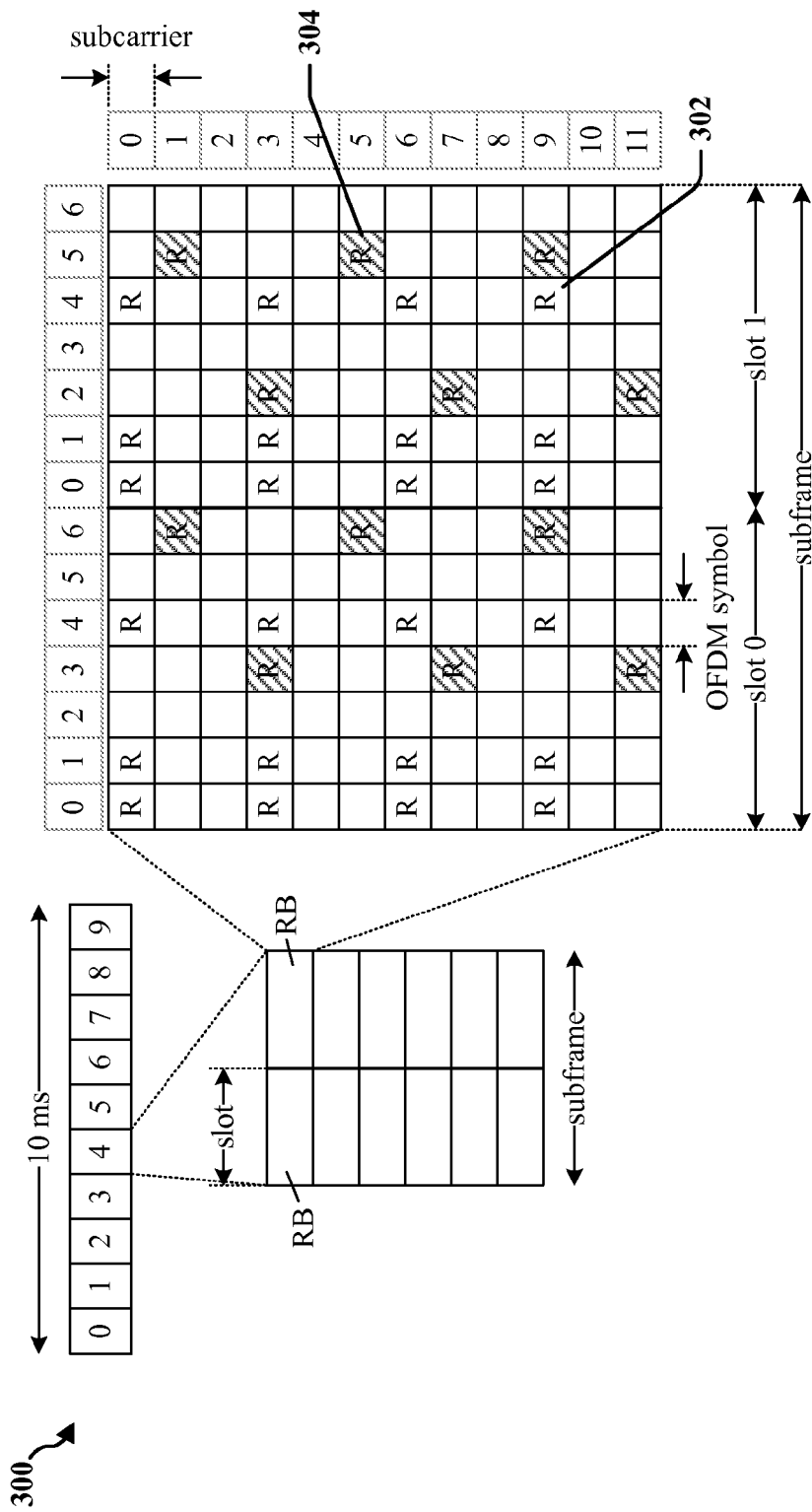
FIG. 3 is a diagram illustrating an example of a DL frame structure in LTE.

FIG. 3 is a diagram 300 illustrating an example of a DL frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
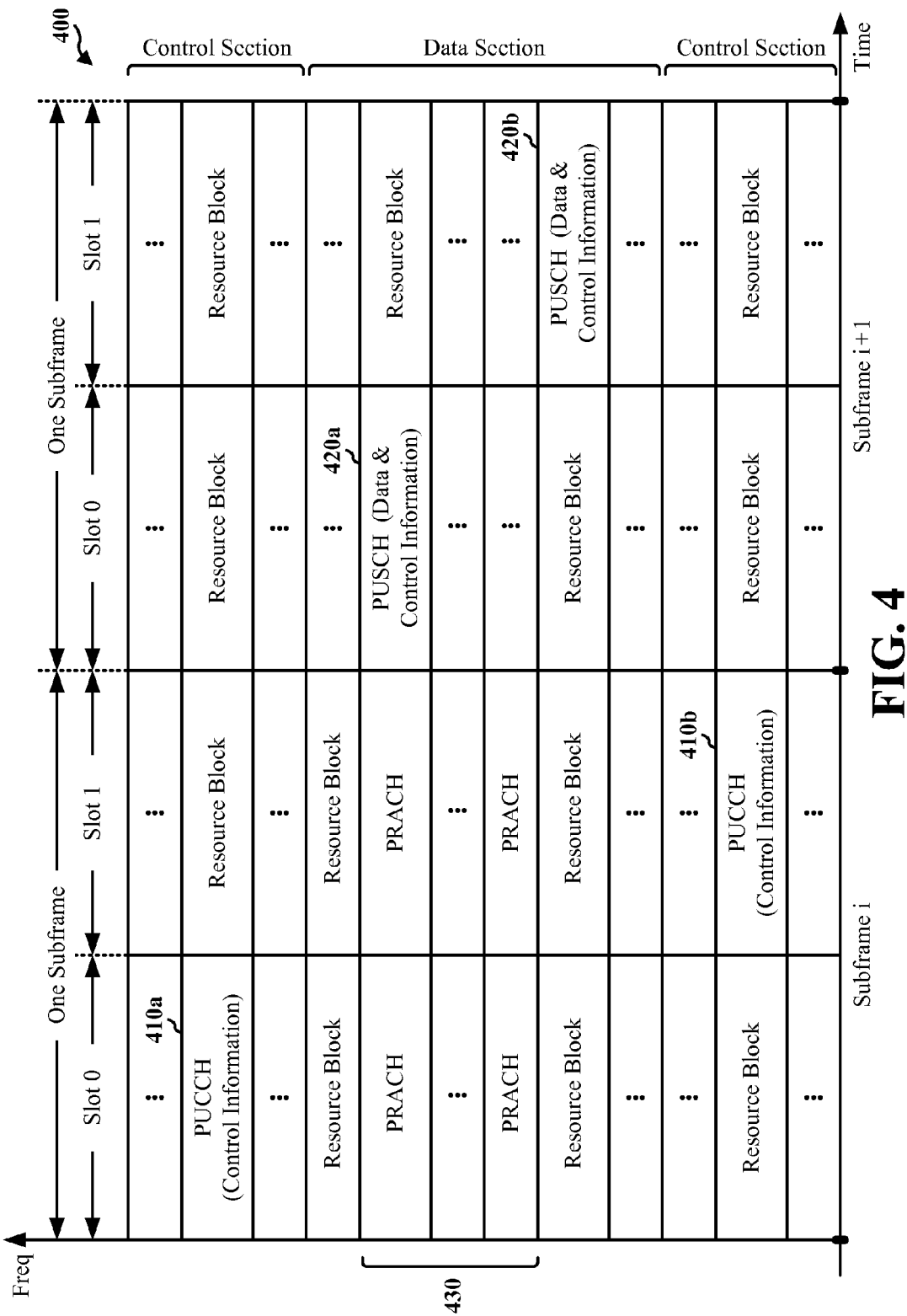
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
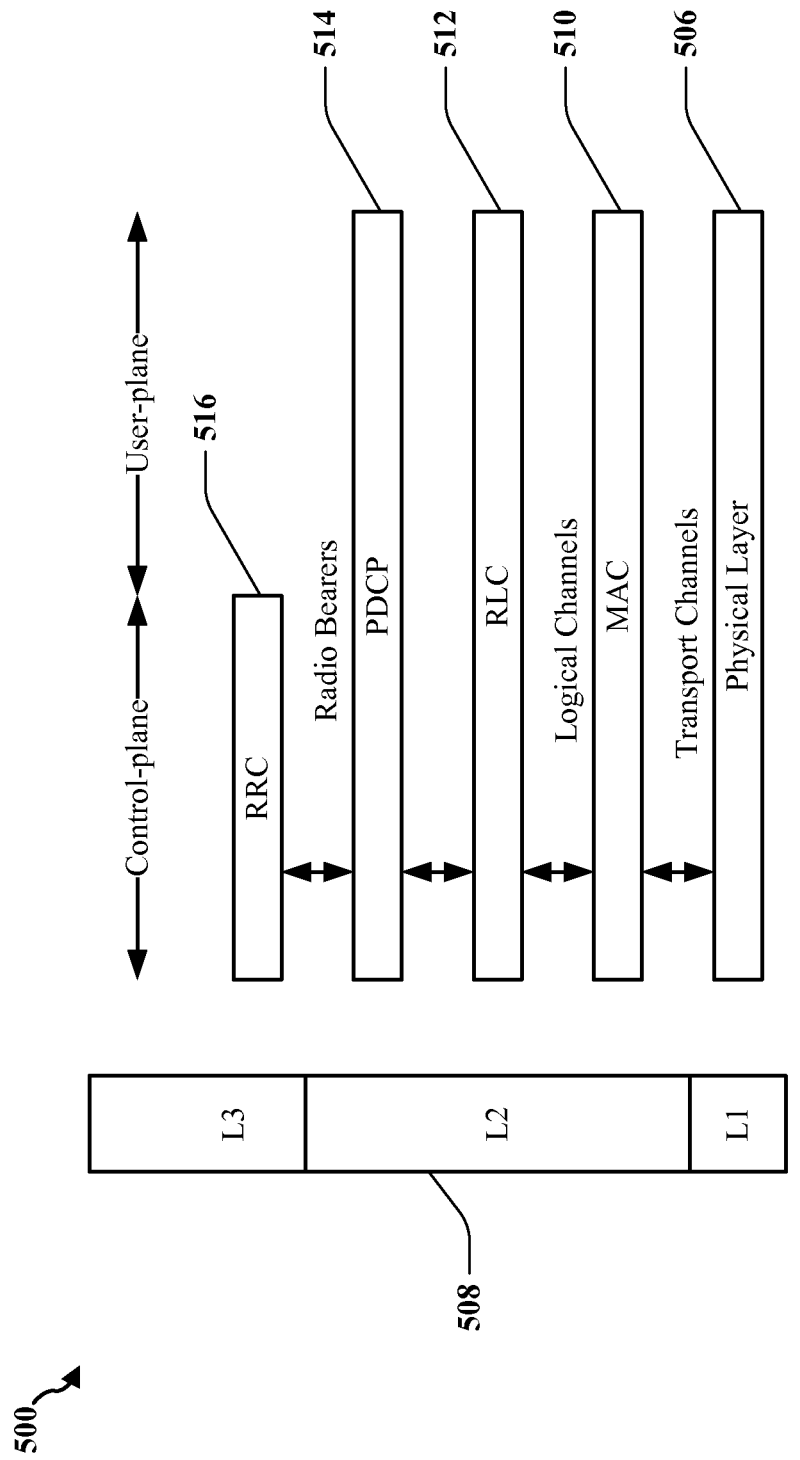
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARM). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
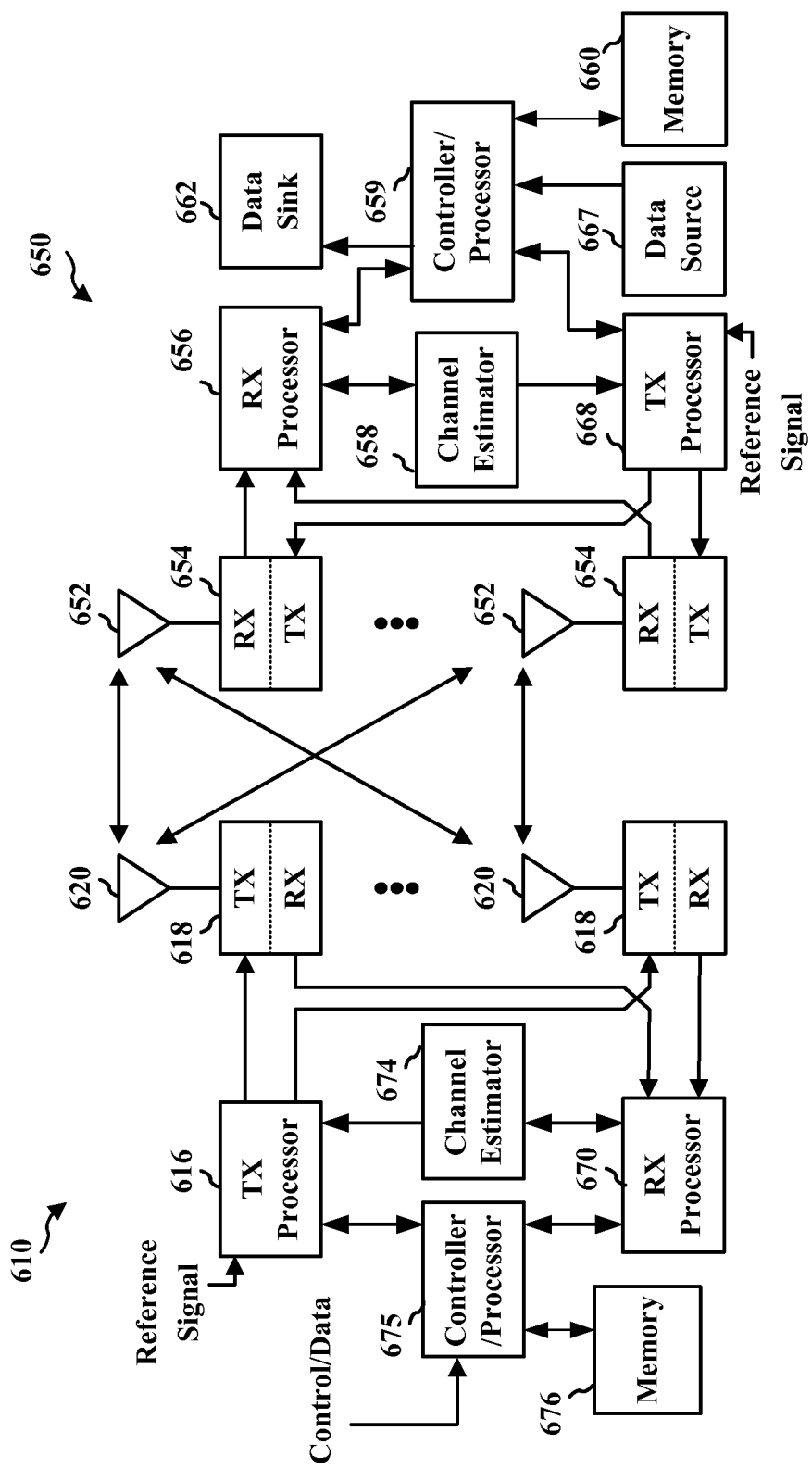
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7A:
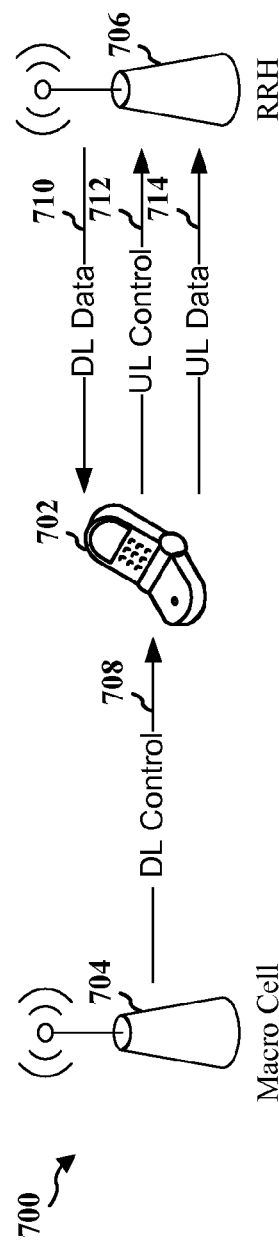
FIGS. 7A and 7B are diagrams illustrating a handover of a communication link in a heterogeneous network.
Figure 7B:
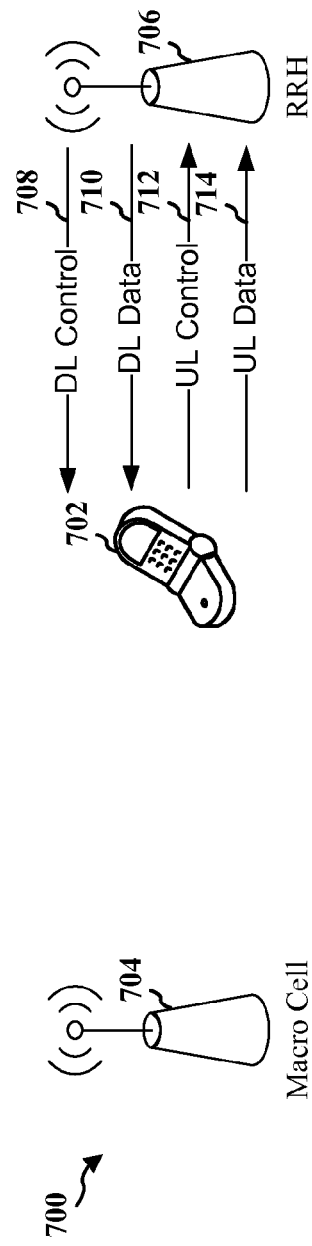

FIGS. 7A and 7B are diagrams 700 illustrating a handover of a communication link in a heterogeneous network. The UE 702 in FIGS. 7A and 7B may be configured for Coordinated Multipoint Transmission (CoMP). As shown in FIG. 7A, the UE 702 may be served by two different cells (e.g., first and second cells). For example, the first cell may be the macro cell 704 and the second cell may be the remote radio head (RRH) 706. The UE 702 may utilize the fact that the UE 702 is served by two or more cells to facilitate a handover.

For example, in one configuration, a DL handover (DL serving cell handover) may be decoupled from a UL handover (UL serving cell handover). In another configuration, and as shown in FIGS. 7A and 7B, the UE 702 may perform a DL handover only, without UL handover. In FIG. 7A, the UE 702 receives DL control from the macro cell 704 via communication link 708, receives DL data from the RRH 706 via the communication link 710, and sends UL control and UL data to the RRH 706 via communication links 712 and 714, respectively. In FIG. 7B, the UE 702 performs a handover of only the communication link 708 configured for DL control, such that the UE 702 receives DL control from RRH 706 after the handover is completed.

In another configuration, the UE 702 may perform a UL handover only, without DL handover. In yet another configuration, the UE 702 may perform both DL and UL handover simultaneously. From the perspective of the UE 702, the UE 702 may be instructed to perform cell switching, however, some of the procedures originally defined for handover may be optimized in light of the fact that the best serving cell for one of the communication links may remain the same before and after the cell switching i.e., virtually no cell switching for one of the links (downlink or uplink). In the sequel, the terminology of "handover" and "cell switching" are used interchangeably. As an example, a handover is not necessarily the same procedure as in the traditional handover, but may refer to switching from one cell to another cell for a UE for at least one communication link (downlink or uplink).

Figure 8:
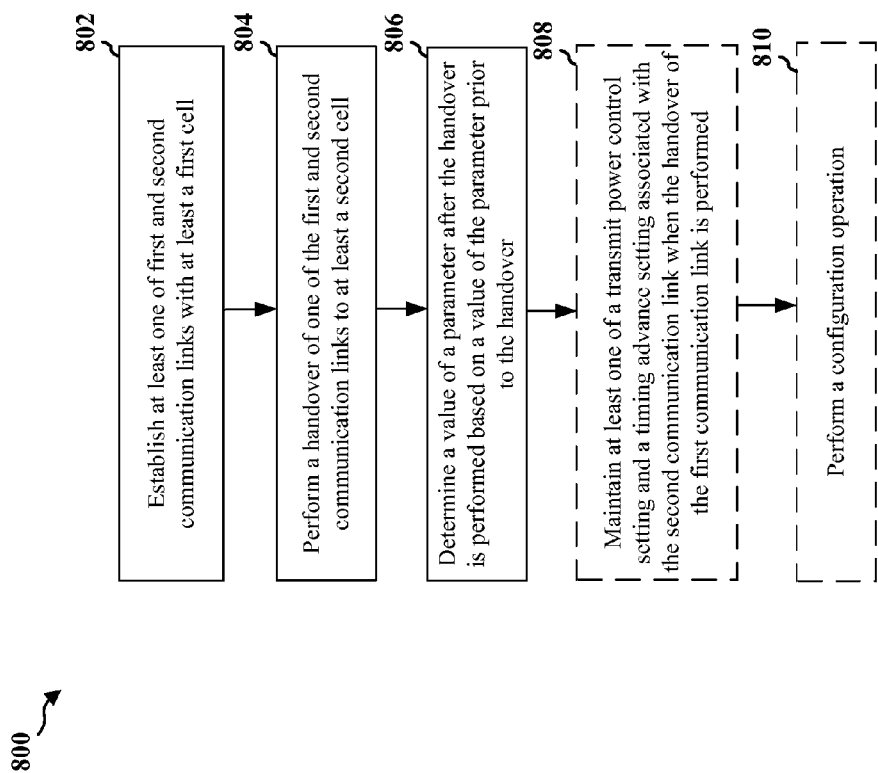
FIG. 8 is a flow chart of a method of wireless communication.

FIG. 8 is a flow chart 800 of a method of wireless communication. The method may be performed by a UE. At step 802, the UE establishes at least one of first and second communication links with at least a first cell, the first communication link for receiving transmissions and the second communication link for sending transmissions. For example, with reference to FIG. 7A, the first cell may be a macro cell 704 and the second cell may be an RRH 706 in a heterogeneous network. In such example, the first communication link may be communication link 708 for receiving DL control from the macro cell 704 and the second communication link may be communication link 714 for sending UL data to the RRH 706. In one configuration, the first and second communication links may be established with the first cell.

At step 804, the UE may perform a handover of one of the first and second communication links to at least a second cell. For example, with reference to FIGS. 7A and 7B, the first communication link (e.g., communication link 708 for DL control) may be handed over from the macro cell 704 to the RRH 706. In one configuration, the first communication link may be established with the first cell and the second communication link with the second cell, and the handover may include handing over the first communication link to the second cell. In another configuration, the second communication link may be established with the first cell and the first communication link with the second cell, and the handover may include handing over the second communication link to the second cell.

At step 806, the UE may determine a value of a parameter after the handover is performed based on a value of the parameter prior to the handover. In an aspect, the parameter may be associated with the other of the one of the first and second communication links involved in the handover. In another aspect, the parameter may be a power control parameter for the UL, a timing parameter for the UL, a cell radio network temporary identifier (C-RNTI), or a rate matching parameter for a PDSCH. In one configuration, when the parameter is a PDSCH rate matching parameter, the value of the parameter after the handover is performed may be determined to be the same as the value of the parameter prior to the handover when the handover of the second communication link is performed. For example, the PDSCH rate matching parameter may include the number of CRS ports and frequency shifts for rate matching.

At step 808, the UE may maintain at least one of a transmit power control setting and a timing advance setting associated with the second communication link when the handover of the first communication link is performed. For example, the transmit power control setting may include the accumulative power control loops $f(i)$ for PUSCH and/or sounding reference signals (SRS) and $g(i)$ for PUCCH.

At step 810, the UE may perform a configuration operation.

In one aspect, the configuration operation may include adjusting the at least one of a transmit power control setting and a timing advance setting associated with the second communication link when the handover of the first communication link is performed. In one configuration, the adjustment may be based on an offset. In one scenario, there may be a power jump due to the change in the first communication link (e.g., DL) pathloss measurement that may result due to handover of the first communication link. To eliminate the jump, the UE may adjust $f(i)$ and $g(i)$ by an appropriate offset. In one configuration, the transmit power control setting may be adjusted in response to a self generated command (e.g., a "self-issued" transmit power control (TPC) command) or a command received via the first communication link. For example, if a communication link of the UE is handed over from the first cell to the second cell, the Tx reference signal received power (RSRP) may be the same for both cells and the Rx RSRP for the second cell may be 3 dB higher than the first cell. Therefore, by maintaining $f(i)$ and $g(i)$, the UE would drop Tx power by 3 dB. Such drop may be avoided by the UE by increasing $f(i)$ by 3 dB at the time of the handover.

In one scenario, there may be a timing jump due to the change in the first communication link (e.g., DL) reference timing as a result of the handover of the first communication link. To eliminate the jump, the UE may adjust the UL transmission timing by an appropriate offset. In one configuration, the transmission timing may be adjusted in response to a self generated command (e.g., a "self-issued" timing command) or a timing advance command received via the first communication link.

In another aspect, the configuration operation may include receiving a physical downlink control channel (PDCCH) order for initiating the handover of the first communication link. The PDCCH order may indicate information for improving handover, such as whether to reset a timing advance and a transmit power control setting after the handover is performed, whether a new reference signal is used for at least one of a timing advance and power control reference, whether at least one of a PRACH procedure and a random access response (RAR) grant is omitted, and/or whether a new PRACH format is used.

In another aspect, the configuration operation may include refraining from performing a PRACH procedure when the handover of the first communication link is performed. For example, since the first cell continues to serve the UE via the second communication link (e.g., UL) after handover of the first communication link, there may be no need to re-synchronize in UL with PRACH. As a result, in one configuration, PRACH may be omitted.

In another aspect, the configuration operation may include performing a new PRACH procedure. For example, the new PRACH may be a more simple form of PRACH, such as a shortened PRACH format.

In another aspect, the configuration operation may include omitting at least one of a cell radio network temporary identifier (C-RNTI) change and a random access response (RAR) grant when the handover of the first communication link is performed. For example, the UE may omit a C-RNTI change if the cells involved in handover can manage a common RNTI for the UE before and after the handover. Moreover, the RAR grant may also be omitted especially when PRACH is omitted and especially when RNTI, timing and power control do not rely on RAR grant after the handover.

In another aspect, the configuration operation may include receiving an explicit or implicit indication that the second communication link with the first cell is to be maintained after the handover is performed. For example, the implicit indication may be received by the UE by checking whether a virtual cell ID configured for PUSCH remains the same or not after handoff is performed. If such virtual cell ID remains the same, the UE may determine that here is no handover of the second communication link (e.g., no UL handover), although the physical cell identifier (PCI) associated with a common search space may have already changed after handover. For example, the explicit indication may be received via a PDCCH order, a MAC element, or RRC signaling.

In another aspect, the configuration operation may include receiving a message via the first communication link indicating a use of a new reference signal (RS) for at least one of open loop power control and timing when the handover of the second communication link is performed. For example, although the first cell continues to serve the UE via the first communication link (e.g., DL) after handover of the second communication link, the first cell may direct the UE to use a new RS (e.g., CRS or CSI-RS) for open loop power control and timing to possibly reset f(i) and/or g(i), as well as the timing advance.

Figure 9:
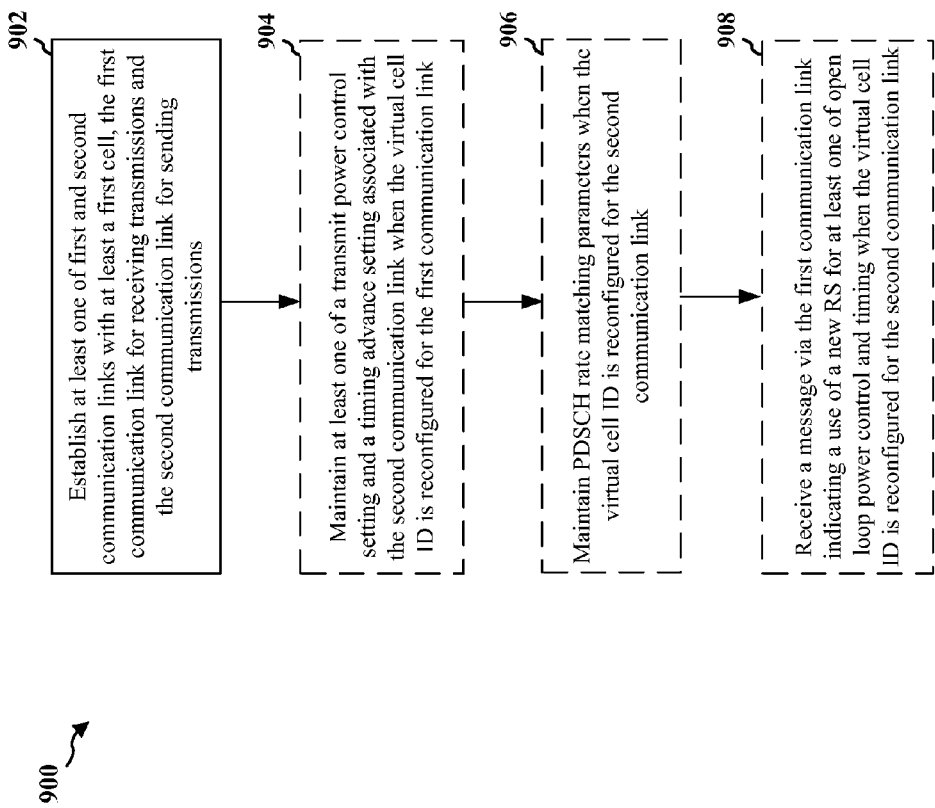
FIG. 9 is a flow chart of a method of wireless communication.

FIG. 9 is a flow chart 900 of a method of wireless communication. The method may be performed by a UE. At step 902, the UE establishes at least one of first and second communication links with at least a first cell, the first communication link for receiving transmissions and the second communication link for sending transmissions. For example, with reference to FIG. 7A, the first cell may be a macro cell 704 and the second cell may be an RRH 706 in a heterogeneous network. In such example, the first communication link may be communication link 708 for receiving DL control from the macro cell 704 and the second communication link may be communication link 714 for sending UL data to the RRH 706. In one configuration, the first and second communication links may be established with the first cell.

The virtual cell ID may be reconfigured for one of the first and second communication links. In one configuration, the virtual cell ID may be re-configured only for the first communication link (e.g., communication link 708 for DL control). In another configuration, the virtual cell ID may be re-configured only for the second communication link (e.g., communication link 714 for UL data).

At step 904, the UE may maintain at least one of a transmit power control setting and a timing advance setting associated with the second communication link when the virtual cell ID is reconfigured for the first communication link.

At step 906, the UE may maintain PDSCH rate matching parameters when the virtual cell ID is reconfigured for the second communication link.

At step 908, the UE may receive a message via the first communication link indicating a use of a new RS for at least one of open loop power control and timing when the virtual cell ID is reconfigured for the second communication link.

The virtual cell ID reconfiguration may be correlated with whether a handover is performed by the UE (e.g., handover decision based on whether PCI for control in common search space is changed). In one configuration, the previously described method of FIG. 9 may apply only if there is no handover. However, if there is handover, a normal handover procedure may be performed. Alternatively, the virtual cell ID reconfiguration may be tied with handover. For example, if there is a DL only handover and virtual cell re-configuration for DL, the method for the DL handover only case may be used; if there is a UL only handover and UL virtual cell ID re-configuration, the method for UL handover only may be used.

Figure 10:
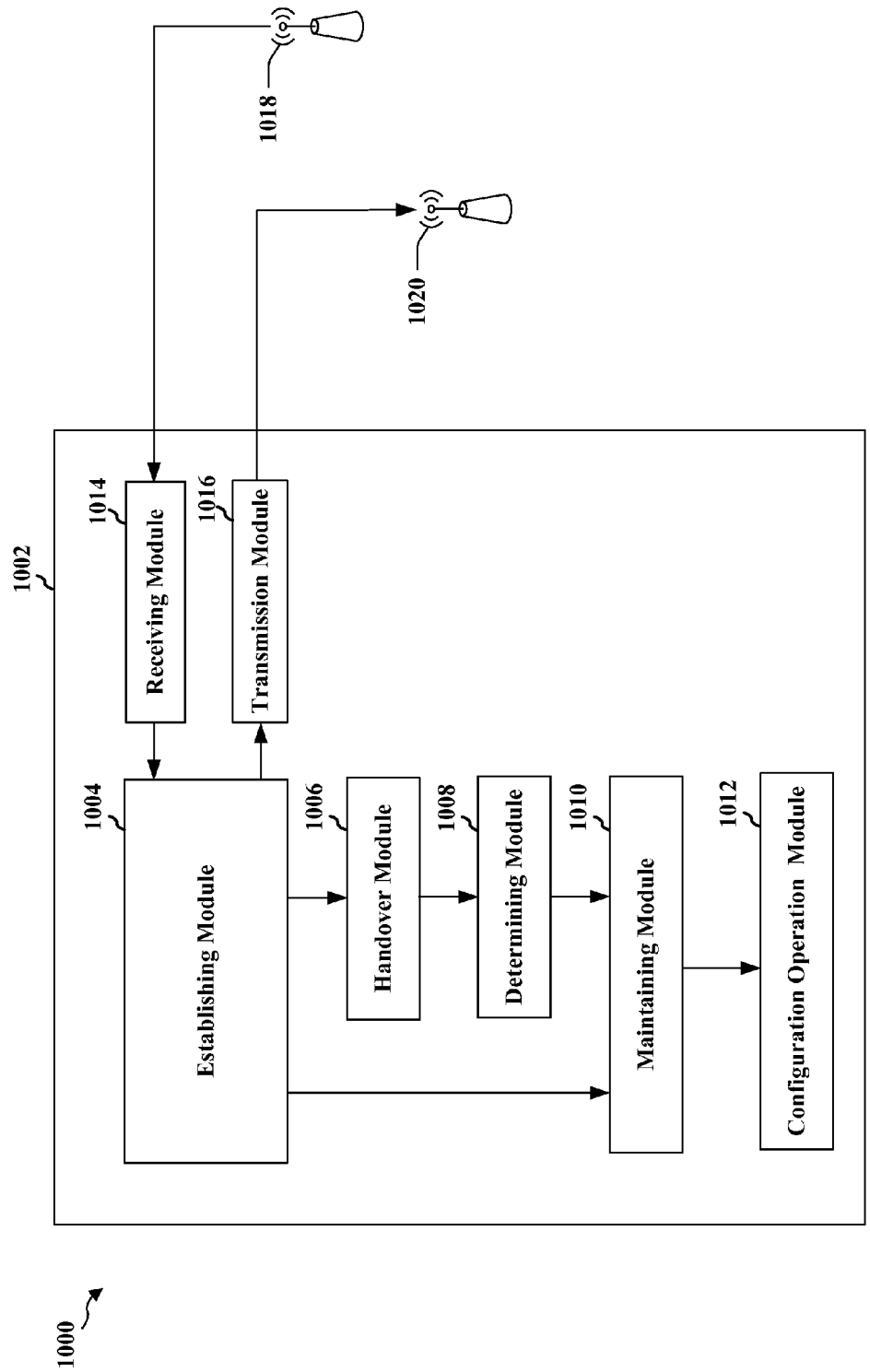
FIG. 10 is a conceptual data flow diagram illustrating the data flow between different modules/means/components in an exemplary apparatus.

FIG. 10 is a conceptual data flow diagram 1000 illustrating the data flow between different modules/means/components in an exemplary apparatus 1002. The apparatus may be a UE. The apparatus includes an establishing module 1004 that establishes at least one of first and second communication links with at least a first cell, the first communication link for receiving transmissions and the second communication link for sending transmissions. The apparatus further includes a handover module 1006 that performs a handover of one of the first and second communication links to at least a second cell. In an aspect, the establishing module establishes the first communication link with the first cell and the second communication link with the second cell, and the handover module 1006 hands over the first communication link to the second cell. In another aspect, the establishing module 1004 establishes the second communication link with the first cell and the first communication link with the second cell, and the handover module 1006 hands over the second communication link to the second cell. In another aspect, the establishing module 1004 establishes the first and second communication link with the first cell.

The apparatus further includes a determining module 1008 that determines a value of a parameter after the handover is performed based on a value of the parameter prior to the handover. In an aspect, the parameter may be a PDSCH rate matching parameter. In such aspect, the determining module 1008 may determine the value of the parameter after the handover is performed to be the same as the value of the parameter prior to the handover when the handover of the second communication link is performed. In another aspect, the parameter is associated with the other of the one of the first and second communication links involved in the handover. In such aspect, the parameter may be a power control parameter for the UL, a timing parameter for the UL, a C-RNTI, or a rate matching parameter for a PDSCH.

The apparatus further includes a maintaining module 1010. In one aspect, the maintaining module 1010 maintains at least one of a transmit power control setting and a timing advance setting associated with the second communication link when the handover of the first communication link is performed. In another aspect, where a virtual cell ID is reconfigured for one of the first and second communication links, the maintaining module 1010 maintains at least one of a transmit power control setting and a timing advance setting associated with the second communication link when the virtual cell ID is reconfigured for the first communication link. In another aspect, where a virtual cell ID is reconfigured for one of the first and second communication links, the maintaining module 1010 maintains PDSCH rate matching parameters when the virtual cell ID is reconfigured for the second communication link.

The apparatus further includes a configuration operation module 1012 that performs configuration operations. In an aspect, the configuration operation may include adjusting at least one of a transmit power control setting and a timing advance setting associated with the second communication link when the handover of the first communication link is performed, the adjustment being based on an offset. In such aspect, the adjustment of the transmit power control setting is performed in response to a self generated command or a command received via the first communication link.

In another aspect, the configuration operation may include refraining from performing a PRACH procedure when the handover of the first communication link is performed. In another aspect, the configuration operation may include performing a new PRACH procedure when the handover of the first communication link is performed. In another aspect, the configuration operation may include omitting at least one of a C-RNTI change and an RAR grant when the handover of the first communication link is performed.

In another aspect, the configuration operation includes receiving, via the receiving module 1014, a PDCCH order for initiating the handover of the first communication link, the PDCCH order indicating at least one of whether to reset a timing advance and a transmit power control setting after the handover is performed, whether a new reference signal is used for at least one of a timing advance and power control reference, whether at least one of a PRACH procedure and an RAR grant is omitted, and whether a new PRACH format is used. For example, the receiving module 1014 may receive the PDCCH order from the macro cell 1018. In another aspect, the configuration operation includes receiving, via the receiving module 1014, an explicit or implicit indication that the second communication link with the first cell is to be maintained after the handover is performed. For example, the receiving module 1014 may receive the explicit or implicit indication from the macro cell 1018. In another aspect, the configuration operation includes receiving, via the receiving module 1014, a message through the first communication link indicating a use of a new RS for at least one of open loop power control and timing when the handover of the second communication link is performed. For example, the receiving module 1014 may receive the message from the macro cell 1018. In another aspect, where a virtual cell ID is reconfigured for one of the first and second communication links, the receiving module 1014 receives a message via the first communication link indicating a use of a new RS for at least one of open loop power control and timing when the virtual cell ID is reconfigured for the second communication link.

The apparatus further includes a transmission module 1016 that sends transmissions. For example, the transmission module 1016 may send transmissions to RRH 1020.

The apparatus may include additional modules that perform each of the steps of the algorithm in the aforementioned flow charts of FIGS. 8 and 9. As such, each step in the aforementioned flow charts of FIGS. 8 and 9 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 11:
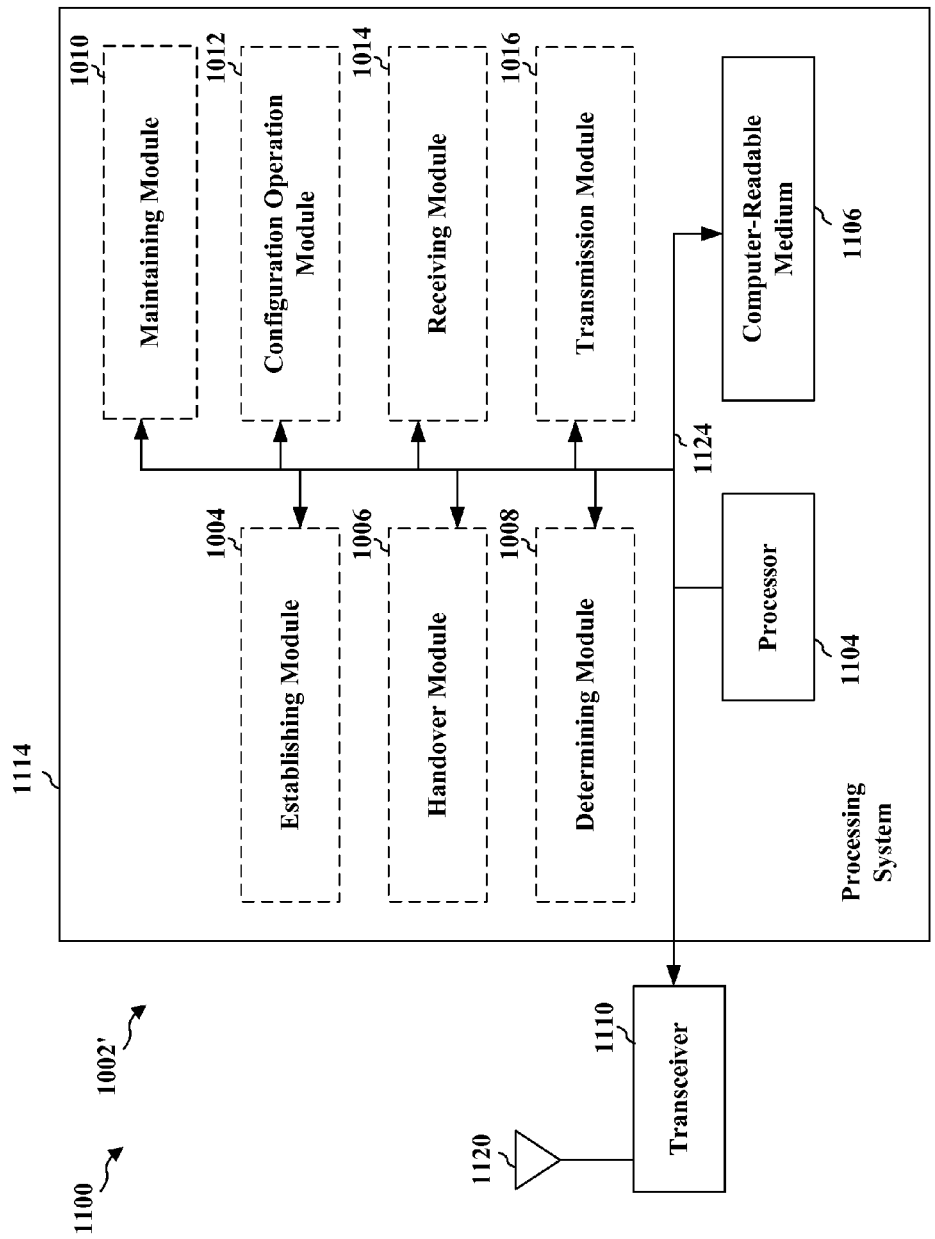
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware modules, represented by the processor 1104, the modules 1004, 1006, 1008, 1010, 1012, 1014, and 1016, and the computer-readable medium 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the receiving module 1014. In addition, the transceiver 1110 receives information from the processing system 1114, specifically the transmission module 1016, and based on the received information, generates a signal to be applied to the one or more antennas 1120. The processing system 1114 includes a processor 1104 coupled to a computer-readable medium 1106. The processor 1104 is responsible for general processing, including the execution of software stored on the computer-readable medium 1106. The software, when executed by the processor 1104, causes the processing system 1114 to perform the various functions described supra for any particular apparatus. The computer-readable medium 1106 may also be used for storing data that is manipulated by the processor 1104 when executing software. The processing system further includes at least one of the modules 1004, 1006, 1008, 1010, 1012, 1014, and 1016. The modules may be software modules running in the processor 1104, resident/stored in the computer readable medium 1106, one or more hardware modules coupled to the processor 1104, or some combination thereof. The processing system 1114 may be a component of the UE 650 and may include the memory 660 and/or at least one of the TX processor 668, the RX processor 656, and the controller/processor 659.

In one configuration, the apparatus 1002/1002' for wireless communication includes means for establishing at least one of first and second communication links with at least a first cell, the first communication link for receiving transmissions and the second communication link for sending transmissions, means for performing a handover of one of the first and second communication links to at least a second cell, means for determining a value of a parameter after the handover is performed based on a value of the parameter prior to the handover, means for maintaining at least one of a transmit power control setting and a timing advance setting associated with the second communication link when the handover of the first communication link is performed, means for adjusting at least one of a transmit power control setting and a timing advance setting associated with the second communication link when the handover of the first communication link is performed, the adjustment being based on an offset, means for receiving a PDCCH order for initiating the handover of the first communication link, the PDCCH order indicating at least one of whether to reset a timing advance and a transmit power control setting after the handover is performed, whether a new reference signal is used for at least one of a timing advance and power control reference, whether at least one of a PRACH procedure and an RAR grant is omitted, and whether a new PRACH format is used, means for refraining from performing a PRACH procedure when the handover of the first communication link is performed, means for performing a new PRACH procedure when the handover of the first communication link is performed, means for omitting at least one of a C-RNTI change and an RAR grant when the handover of the first communication link is performed, means for receiving an explicit or implicit indication that the second communication link with the first cell is to be maintained after the handover is performed, means for receiving a message via the first communication link indicating a use of a new RS for at least one of open loop power control and timing when the handover of the second communication link is performed, means for transmitting, means for maintaining at least one of a transmit power control setting and a timing advance setting associated with the second communication link when the virtual cell ID is reconfigured for the first communication link, means for maintaining PDSCH rate matching parameters when the virtual cell ID is reconfigured for the second communication link, means for receiving a message via the first communication link indicating a use of a new RS for at least one of open loop power control and timing when the virtual cell ID is reconfigured for the second communication link. The aforementioned means may be one or more of the aforementioned modules of the apparatus 1002 and/or the processing system 1114 of the apparatus 1002' configured to perform the functions recited by the aforementioned means. As described supra, the processing system 1114 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication comprising:
    establishing at least one of first and second communication links with at least a first cell, the first communication link for receiving transmissions and the second communication link for sending transmissions;
    performing a handover of one of the first and second communication links to at least a second cell;
    determining, by a user equipment (UE), a value of a parameter associated with the second communication link after the handover of the first communication link is performed, the determination of the value of the parameter is based on a value of the parameter associated with the second communication link prior to the handover;
    maintaining at least one of a transmit power control setting or a timing advance setting associated with the second communication link when the handover of the first communication link is performed; and
    performing a configuration operation, wherein the configuration operation includes adjusting at least one of a transmit power control setting or a timing advance setting associated with the second communication link when the handover of the first communication link is performed, the adjustment being based on an offset.

2. The method of claim 1, wherein the establishing comprises establishing the first communication link with the first cell and the second communication link with the second cell, and the handover includes handing over the first communication link to the second cell.

3. The method of claim 1, wherein the establishing comprises establishing the second communication link with the first cell and the first communication link with the second cell, and the handover includes handing over the second communication link to the second cell.

4. The method of claim 1, wherein the establishing comprises establishing the first and second communication links with the first cell.

5. The method of claim 1, wherein the adjustment of the transmit power control setting is performed in response to a self generated command or a command received via the first communication link.

6. The method of claim 1, further comprising receiving a physical downlink control channel (PDCCH) order for initiating the handover of the first communication link, the PDCCH order indicating at least one of whether to reset a timing advance or a transmit power control setting after the handover is performed, whether a new reference signal is used for at least one of a timing advance or power control reference, whether at least one of a physical random access channel (PRACH) procedure or a random access response (RAR) grant is omitted, and whether a new PRACH format is used.

7. The method of claim 1, further comprising refraining from performing a physical random access channel (PRACH) procedure when the handover of the first communication link is performed.

8. The method of claim 1, further comprising performing a new physical random access channel (PRACH) procedure when the handover of the first communication link is performed.

9. The method of claim 1, further comprising omitting at least one of a cell radio network temporary identifier (C-RNTI) change or a random access response (RAR) grant when the handover of the first communication link is performed.

10. The method of claim 1, further comprising receiving an explicit or implicit indication that the second communication link with the first cell is to be maintained after the handover is performed.

11. The method of claim 1, wherein the parameter is a physical downlink shared channel (PDSCH) rate matching parameter and wherein the value of the parameter after the handover is performed is determined to be the same as the value of the parameter prior to the handover when the handover of the second communication link is performed.

12. The method of claim 1, further comprising receiving a message via the first communication link indicating a use of a new reference signal (RS) for at least one of open loop power control or timing when the handover of the second communication link is performed.

13. The method of claim 1, wherein the parameter is associated with the other of the one of the first and second communication links involved in the handover.

14. The method of claim 13, wherein the parameter is a power control parameter for an uplink (UL), a timing parameter for the UL, a cell radio network temporary identifier (C-RNTI), or a rate matching parameter for a physical downlink shared channel (PD SCH).

15. A method of wireless communication comprising:
establishing at least one of first and second communication links with at least a first cell, the first communication link for receiving transmissions and the second communication link for sending transmissions;
determining, by a user equipment (UE), whether a virtual cell ID is reconfigured for one of the first and second communication links; and
maintaining physical downlink shared channel (PDSCH) rate matching parameters based on determining that the virtual cell ID is reconfigured for the second communication link.

16. The method of claim 15, further comprising maintaining at least one of a transmit power control setting or a timing advance setting associated with the second communication link when the virtual cell ID is reconfigured for the first communication link.

17. The method of claim 15, further comprising receiving a message via the first communication link indicating a use of a new reference signal (RS) for at least one of open loop power control and timing when the virtual cell ID is reconfigured for the second communication link.

18. The method of claim 15, further comprising determining a value of a parameter after the virtual cell ID is reconfigured based on a value of the parameter prior to the virtual cell ID is reconfigured.

19. An apparatus for wireless communication, the apparatus being a user equipment (UE), comprising:
means for establishing at least one of first and second communication links with at least a first cell, the first communication link for receiving transmissions and the second communication link for sending transmissions;
means for performing a handover of one of the first and second communication links to at least a second cell;
means for determining, by a user equipment (UE), a value of a parameter associated with the second communication link after the handover of the first communication link is performed, the determination of the value of the parameter is based on a value of the parameter associated with the second communication link prior to the handover;
means for maintaining at least one of a transmit power control setting or a timing advance setting associated with the second communication link when the handover of the first communication link is performed; and
means for performing a configuration operation, wherein the configuration operation includes adjusting at least one of a transmit power control setting or a timing advance setting associated with the second communication link when the handover of the first communication link is performed, the adjustment being based on an offset.

20. The apparatus of claim 19, wherein the means for establishing is configured to establish the first communication link with the first cell and the second communication link with the second cell, and the handover includes handing over the first communication link to the second cell.

21. The apparatus of claim 19, wherein the means for establishing is configured to establish the second communication link with the first cell and the first communication link with the second cell, and the handover includes handing over the second communication link to the second cell.

22. The apparatus of claim 19, wherein the means for establishing is configured to establish the first and second communication links with the first cell.

23. The apparatus of claim 19, further comprising means for refraining from performing a physical random access channel (PRACH) procedure when the handover of the first communication link is performed.

24. An apparatus for wireless communication, the apparatus being a user equipment (UE), comprising:
means for establishing at least one of first and second communication links with at least a first cell, the first communication link for receiving transmissions and the second communication link for sending transmissions;
means for receiving and transmitting;
means for determining whether a virtual cell ID is reconfigured for one of the first and second communication links; and
means for maintaining physical downlink shared channel (PDSCH) rate matching parameters based on determining that the virtual cell ID is reconfigured for the second communication link.

25. The apparatus of claim 24, further comprising means for maintaining at least one of a transmit power control setting or a timing advance setting associated with the second communication link when the virtual cell ID is reconfigured for the first communication link.

26. The apparatus of claim 24, further comprising means for determining a value of a parameter after the virtual cell ID is reconfigured based on a value of the parameter prior to the virtual cell ID is reconfigured.

27. An apparatus for wireless communication, the apparatus being a user equipment (UE), comprising:
a memory; and
a processor coupled to the memory, the processor configured to:
establish at least one of first and second communication links with at least a first cell, the first communication link for receiving transmissions and the second communication link for sending transmissions;

perform a handover of one of the first and second communication links to at least a second cell;

determine a value of a parameter associated with the second communication link after the handover of the first communication link is performed, the determination of the value of the parameter is based on a value of the parameter associated with the second communication link prior to the handover; and maintain at least one of a transmit power control setting or a timing advance setting associated with the second communication link when the handover of the first communication link is performed; and perform a configuration operation, wherein the configuration operation includes adjusting at least one of a transmit power control setting or a timing advance setting associated with the second communication link when the handover of the first communication link is performed, the adjustment being based on an offset.

28. The apparatus of claim 27, wherein the processor is further configured to establish the first communication link with the first cell and the second communication link with the second cell, and the handover includes handing over the first communication link to the second cell.

29. The apparatus of claim 27, wherein the processor is further configured to establish the second communication link with the first cell and the first communication link with the second cell, and the handover includes handing over the second communication link to the second cell.

30. The apparatus of claim 27, wherein the processor is further configured to establish the first and second communication links with the first cell.

31. The apparatus of claim 27, wherein the processor is further configured to adjust the transmit power control setting in response to a self generated command or a command received via the first communication link.

32. The apparatus of claim 27, wherein the processor is further configured to receive a physical downlink control channel (PDCCH) order for initiating the handover of the first communication link, the PDCCH order indicating at least one of whether to reset a timing advance or a transmit power control setting after the handover is performed, whether a new reference signal is used for at least one of a timing advance or power control reference, whether at least one of a physical random access channel (PRACH) procedure or a random access response (RAR) grant is omitted, and whether a new PRACH format is used.

33. The apparatus of claim 27, wherein the processor is further configured to refrain from performing a physical random access channel (PRACH) procedure when the handover of the first communication link is performed.

34. The apparatus of claim 27, wherein the processor is further configured to perform a new physical random access channel (PRACH) procedure when the handover of the first communication link is performed.

35. The apparatus of claim 27, wherein the processor is further configured to omit at least one of a cell radio network temporary identifier (C-RNTI) change or a random access response (RAR) grant when the handover of the first communication link is performed.

36. The apparatus of claim 27, wherein the processor is further configured to receive an explicit or implicit indication that the second communication link with the first cell is to be maintained after the handover is performed.

37. The apparatus of claim 27, wherein the parameter is a physical downlink shared channel (PDSCH) rate matching parameter and wherein the value of the parameter after the handover is performed is determined to be the same as the value of the parameter prior to the handover when the handover of the second communication link is performed.

38. The apparatus of claim 27, wherein the processor is further configured to receive a message via the first communication link indicating a use of a new reference signal (RS) for at least one of open loop power control or timing when the handover of the second communication link is performed.

39. The apparatus of claim 27, wherein the parameter is associated with the other of the one of the first and second communication links involved in the handover.

40. The apparatus of claim 39, wherein the parameter is a power control parameter for an uplink (UL), a timing parameter for the UL, a cell radio network temporary identifier (C-RNTI), or a rate matching parameter for a physical downlink shared channel (PDSCH).

41. An apparatus for wireless communication, the apparatus being a user equipment (UE), comprising:

a memory; and a processor coupled to the memory, the processor configured to:

establish at least one of first and second communication links with at least a first cell, the first communication link for receiving transmissions and the second communication link for sending transmissions; and determining whether a virtual cell ID is reconfigured for one of the first and second communication links; and maintain physical downlink shared channel (PDSCH) rate matching parameters based on determining that the virtual cell ID is reconfigured for the second communication link.

42. The apparatus of claim 41, wherein the processor is further configured to maintain at least one of a transmit power control setting or a timing advance setting associated with the second communication link when the virtual cell ID is reconfigured for the first communication link.

43. The apparatus of claim 41, wherein the processor is further configured to receive a message via the first communication link indicating a use of a new reference signal (RS) for at least one of open loop power control or timing when the virtual cell ID is reconfigured for the second communication link.

44. The apparatus of claim 41, wherein the processor is further configured to determine a value of a parameter after the virtual cell ID is reconfigured based on a value of the parameter prior to the virtual cell ID is reconfigured.

45. A non-transitory computer-readable medium storing computer executable code for use at a user equipment (UE), comprising code for:

establishing at least one of first and second communication links with at least a first cell, the first communication link for receiving transmissions and the second communication link for sending transmissions;

performing a handover of one of the first and second communication links to at least a second cell;

determining a value of a parameter associated with the second communication link after the handover of the first communication link is performed, the determination of the value of the parameter is based on a value of the parameter associated with the second communication link prior to the handover;

maintaining at least one of a transmit power control setting or a timing advance setting associated with the second communication link when the handover of the first communication link is performed; and performing a configuration operation, wherein the configuration operation includes adjusting at least one of a transmit power control setting or a timing advance setting associated with the second communication link when the handover of the first communication link is performed, the adjustment being based on an offset.

46. A non-transitory computer-readable medium for use at a user equipment (UE), comprising code for:
  establishing at least one of first and second communication links with at least a first cell, the first communication link for receiving transmissions and the second communication link for sending transmissions; and
  determining whether a virtual cell ID is reconfigured for one of the first and second communication links; and
  maintaining physical downlink shared channel (PDSCH) rate matching parameters based on determining that the virtual cell ID is reconfigured for the second communication link.

47. The method of claim 46, the non-transitory computer-readable medium further comprising code for determining a value of a parameter after the virtual cell ID is reconfigured based on a value of the parameter prior to the virtual cell ID is reconfigured.

* * * * *